United States Patent [19]
Gildea et al.

[11] Patent Number: 5,566,383
[45] Date of Patent: Oct. 15, 1996

[54] DRIVE PLATFORM ASSEMBLY WITH ROTATABLE MOUNTING BRACKETS AND AUTOMATIC GROUNDING BRACKET

[75] Inventors: Larry A. Gildea, Kalamazoo; Ramesh Marwah, St. Joseph, both of Mich.

[73] Assignee: Zenith Data Systems Corporation, Buffalo Grove, Ill.

[21] Appl. No.: 406,777

[22] Filed: Mar. 17, 1995

Related U.S. Application Data

[63] Continuation of Ser. No. 42,094, Apr. 1, 1993, abandoned.

[51] Int. Cl.$^6$ .............................. G06F 1/16; H05K 7/16
[52] U.S. Cl. ............................. 361/685; 361/726
[58] Field of Search .................. 360/137; 439/928.1; 364/708.1; 312/223.2; 174/35 GC, 35 R, 51; 361/683, 685, 725–727, 816, 818

[56] References Cited

U.S. PATENT DOCUMENTS

| | | | |
|---|---|---|---|
| 5,067,041 | 11/1991 | Cooke et al. | 361/685 |
| 5,098,175 | 3/1992 | Cooke et al. . | |
| 5,100,215 | 3/1992 | Cooke et al. . | |
| 5,112,119 | 5/1992 | Cooke et al. | 361/685 |
| 5,136,466 | 8/1992 | Remise et al. | 361/685 |
| 5,142,447 | 8/1992 | Cooke et al. | 361/685 X |

FOREIGN PATENT DOCUMENTS

0425176A2  5/1991  European Pat. Off. .

OTHER PUBLICATIONS

Photograph of drive carrier for disk drives, no date.

*Primary Examiner*—Michael W. Phillips
*Attorney, Agent, or Firm*—Fitch, Even, Tabin & Flannery

[57] ABSTRACT

A drive platform assembly for a personal computer for carrying both floppy disc drives and hard disc drives which facilitates the installation and replacement of such disc drives. The drive platform assembly includes a drive platform and an expansion platform. The drive platform is adapted to carry a 3.5 inch floppy disc drive and two 3.5 inch (1-inch height or a single 1.56-inch height) IDE hard disc drives. A mounting bracket is provided for carrying either a floppy disc drive or a hard disc drive that is rotated into place within the drive platform. Once rotated into place, the mounting bracket is automatically grounded. The mounting bracket is adapted to be secured to the drive platform relatively quickly and easily without the use of fasteners. An expansion platform is provided and adapted to be releasably secured to the drive platform to form the drive platform assembly. The expansion platform is adapted to carry additional floppy or hard disk drives.

15 Claims, 15 Drawing Sheets

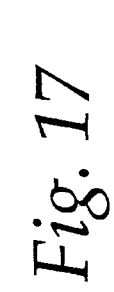
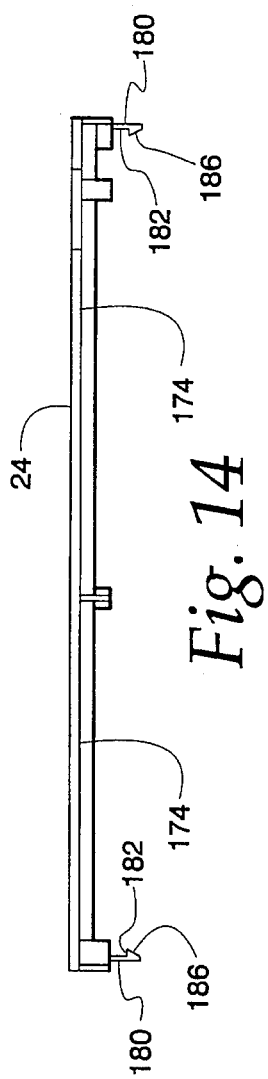
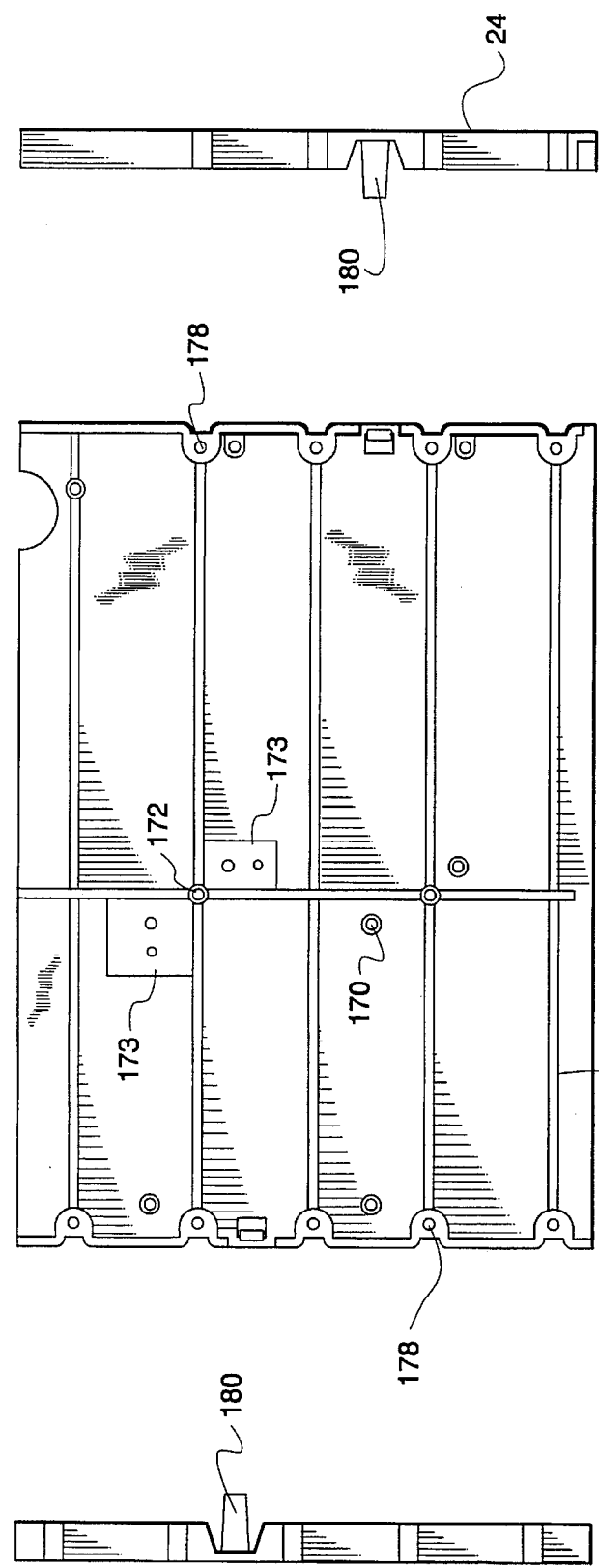

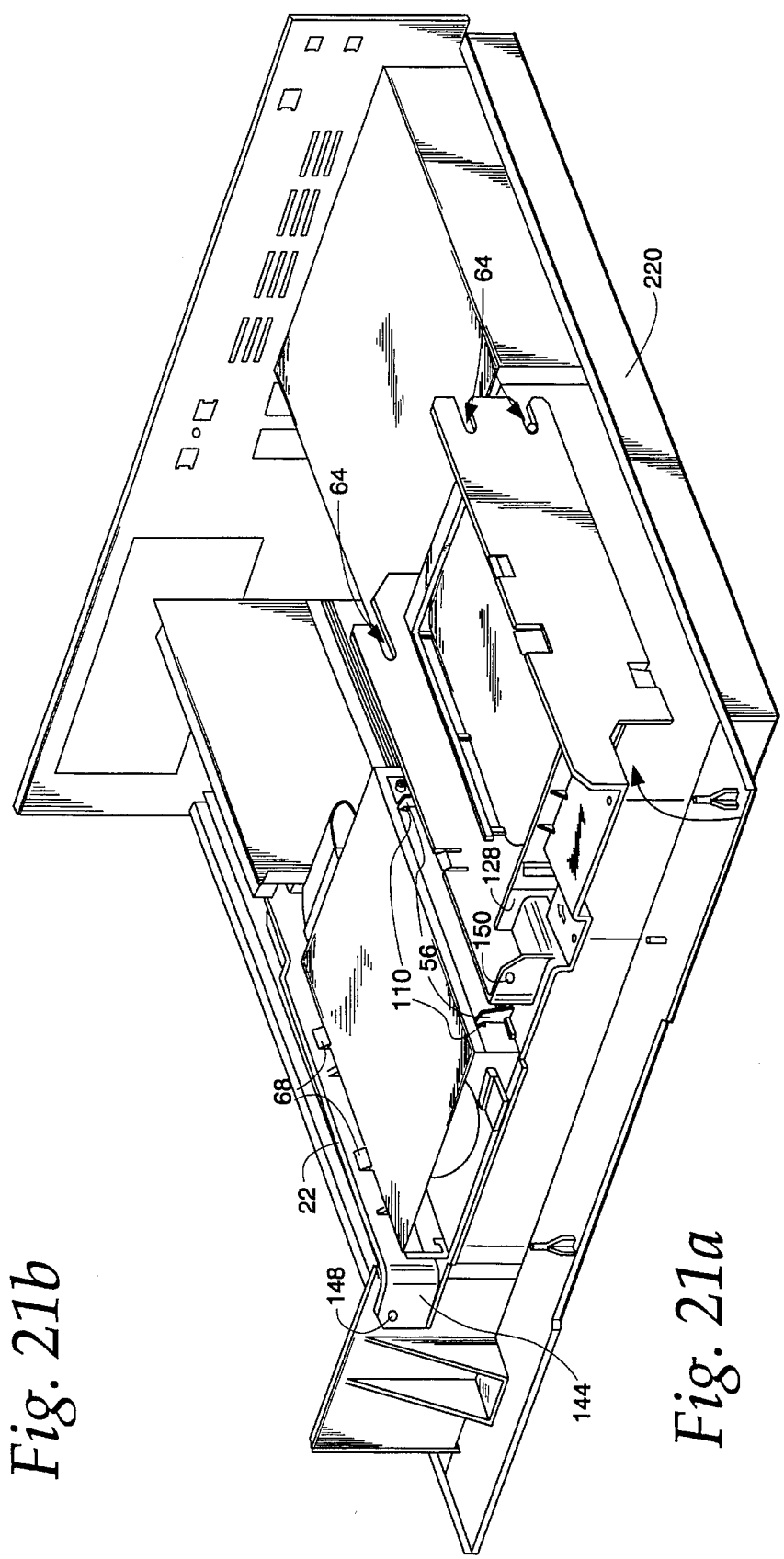
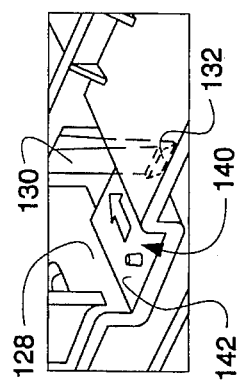
Fig. 21a
Fig. 21b

DRIVE PLATFORM ASSEMBLY WITH ROTATABLE MOUNTING BRACKETS AND AUTOMATIC GROUNDING BRACKET

This application is a continuation of application Ser. No. 08/042,094 filed Apr. 1, 1993 now abandoned.

BACKGROUND OF THE INVENTION

1. Field of the Invention

The present invention relates to a drive platform assembly and, more particularly, to a drive platform assembly for a personal computer for carrying both floppy disc drives and hard disc drives in a computer housing that reduces the assembly and disassembly time of the personal computer and, hence reduces the manufacturing and repair cost.

2. Description of the Prior Art

Known personal computers generally include a metal drive platform for carrying both hard and floppy disc drives. The disc drives are normally secured to the drive platform with suitable fasteners, for example, threaded screws to form an assembly. The assembly, in turn, is rigidly secured to the computer housing.

A known drive platform 21 is illustrated in FIG. 1. The drive platform 21 includes a generally U-shaped member defining a bight portion 23 and two depending wall portions 25 and 27. The length and width of the bight portion 23 is selected to conveniently receive either a hard disc drive 29 or a floppy disc drive 31. The height of the depending wall portions 25 and 27 is selected to receive either two full height disc drives, four half height disc drives or an equivalent combination of full and half height disc drives.

The depending wall portions 25 and 27 include a plurality of inwardly extending tabs 33. These inwardly extending tabs 33 enable the disc drives 29 or 31 to rest in place while they are being secured to the depending wall portions 25 and 27. More particularly, two inwardly extending tabs 33 are spaced apart and horizontally aligned at various heights along the depending wall portions 25 and 27. The locations for the extending tabs 33 are selected to correspond with the heights of full height and half height disc drives. Disposed adjacent each adjacent tab 33 are one or more unthreaded apertures 35. These apertures 35 are oriented to be aligned with corresponding threaded apertures provided in both the hard disc 29 and floppy disc drives 31. In particular, as shown, the hard disc drive 29 and floppy disc drive 31 are shown with four threaded apertures 37. As such, four unthreaded apertures 35 are provided on the depending wall portions 25 and 27 so as to be aligned with the threaded apertures 37 on the hard disc and floppy disc drives 29 and 31 to enable the hard disc drives 29 and floppy disc drives 31 be secured to the depending wall portions 25 and 27 by suitable threaded fasteners 39. As shown, two pairs of threaded apertures 35 are provided at the various half height and full height locations along each depending wall portions 25 and 26.

Referring to FIG. 2, provisions are also provided for securing the drive platform 21 to a computer housing 41. In particular, the bight portion 23 of the drive platform 21 may be formed with an upwardly extending tab 43 which includes an aperture 45 which enables the drive platform 21 to be secured to the front of the computer housing 41. In addition, additional apertures (not shown) may be provided on the opposing end of the bight portion 23 to enable the drive platform 21 to be secured to the rear portion of the computer housing 41.

For IBM-compatible personal computers, the computer housing is normally formed to receive two full height or four half height disc drives. Accordingly, as shown in FIG. 2, two drive platforms 21 are disposed in the computer housing 41 to be aligned with an opening 43 for the disc drives; each drive platform adapted to receive either a single full height disc drive or two half height disc drives. The drive platforms 21 are then secured in place as discussed above. A power supply 49 is disposed in the rear portion of the computer housing 40 and rigidly secured thereto. A motherboard 47 is further secured to the computer housing 40 and appropriate electrical connection between the disc drives 29 and 31, the power supply 49 and the motherboard 47 are made.

A problem with known drive platforms, for example, the drive platform 21 described above, is the relative complexity and time required to assemble the disc drives 29 and 31 to the drive platform and, in turn, to the computer housing 41. Due to the number of fasteners required to secure each disc drive 29 or 31 to the drive platform 21, the complexity and time and hence the labor cost of assembly is relatively substantial. This substantial labor cost increases the price of the personal computer. In addition, such known drive platforms can increase the cost of disc drive replacement or upgrades by computer technicians.

SUMMARY

It is an object of the present invention to solve various problems associated with the prior art.

It is a further object of the present invention to reduce the time and complexity of assembling personal computers.

It is yet a further object of the present invention to provide a drive platform for carrying disc drives.

It is yet another object of the present invention to provide a drive platform which enables disc drives to be quickly assembled thereto.

BRIEF DESCRIPTION OF THE DRAWING

These and other objects of the present invention will be readily understood with reference to the following specification and accompanying drawing, wherein:

FIG. 14 is a rear elevational view of the expansion platform illustrated in FIG. 12;

FIG. 15 is a bottom plan view of the expansion platform illustrated in FIG. 12;

FIG. 16 is an end view of the expansion platform illustrated in FIG. 12;

FIG. 17 is an end view of the end of the expansion platform illustrated in FIG. 12 of the end opposite that illustrated in FIG. 16;

FIGS. 18b and 18c are enlarged detailed views of the drive platform assembly illustrated in FIG. 18a;

FIG. 21a is a perspective view illustrating the insertion of the drive platform assembly in accordance with the present invention being inserted into a computer housing;

FIG. 21b is an enlarged detailed view illustrating the securement of the front portion of the drive platform assembly in accordance with the present invention to the computer housing;

DETAILED DESCRIPTION OF THE PREFERRED EMBODIMENT

Figure 1:
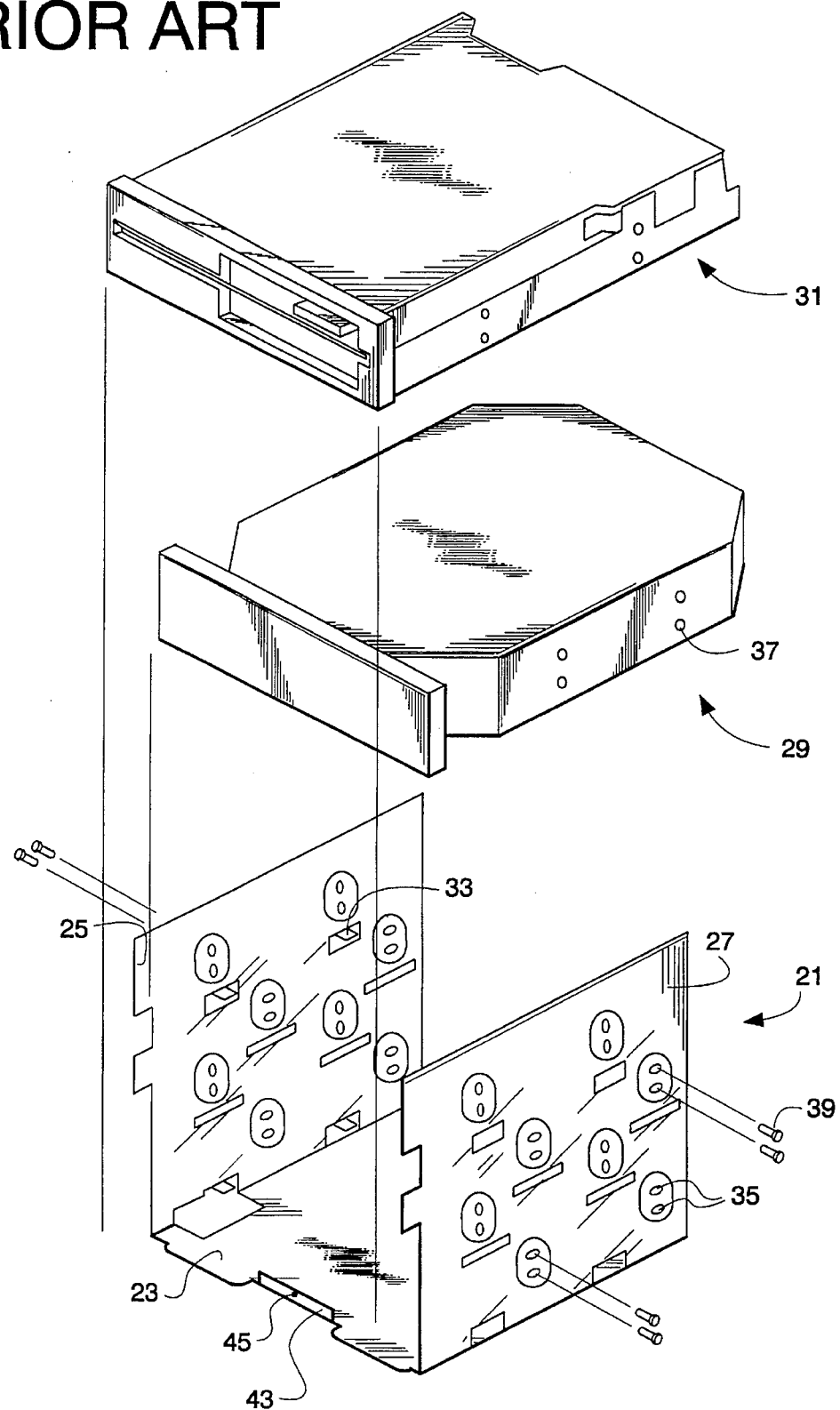
FIG. 1 is an exploded perspective view of a known drive platform for a personal computer illustrating both a hard disc drive and a floppy disc drive.
Figure 2:
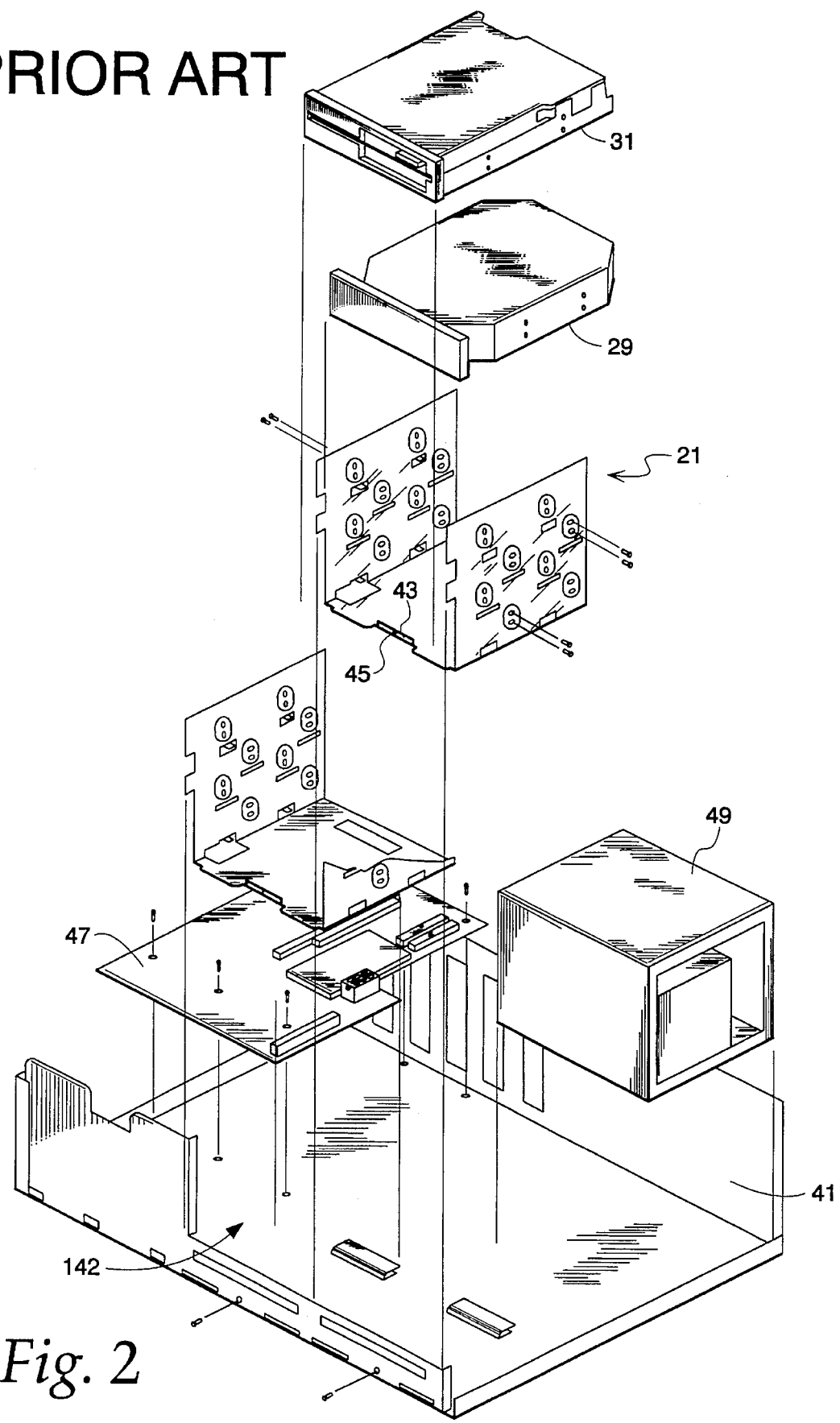
FIG. 2 is similar to FIG. 1 and additionally illustrates a pair of drive platform assemblies, a computer housing, a motherboard and a power supply for a personal computer.
Figure 3:
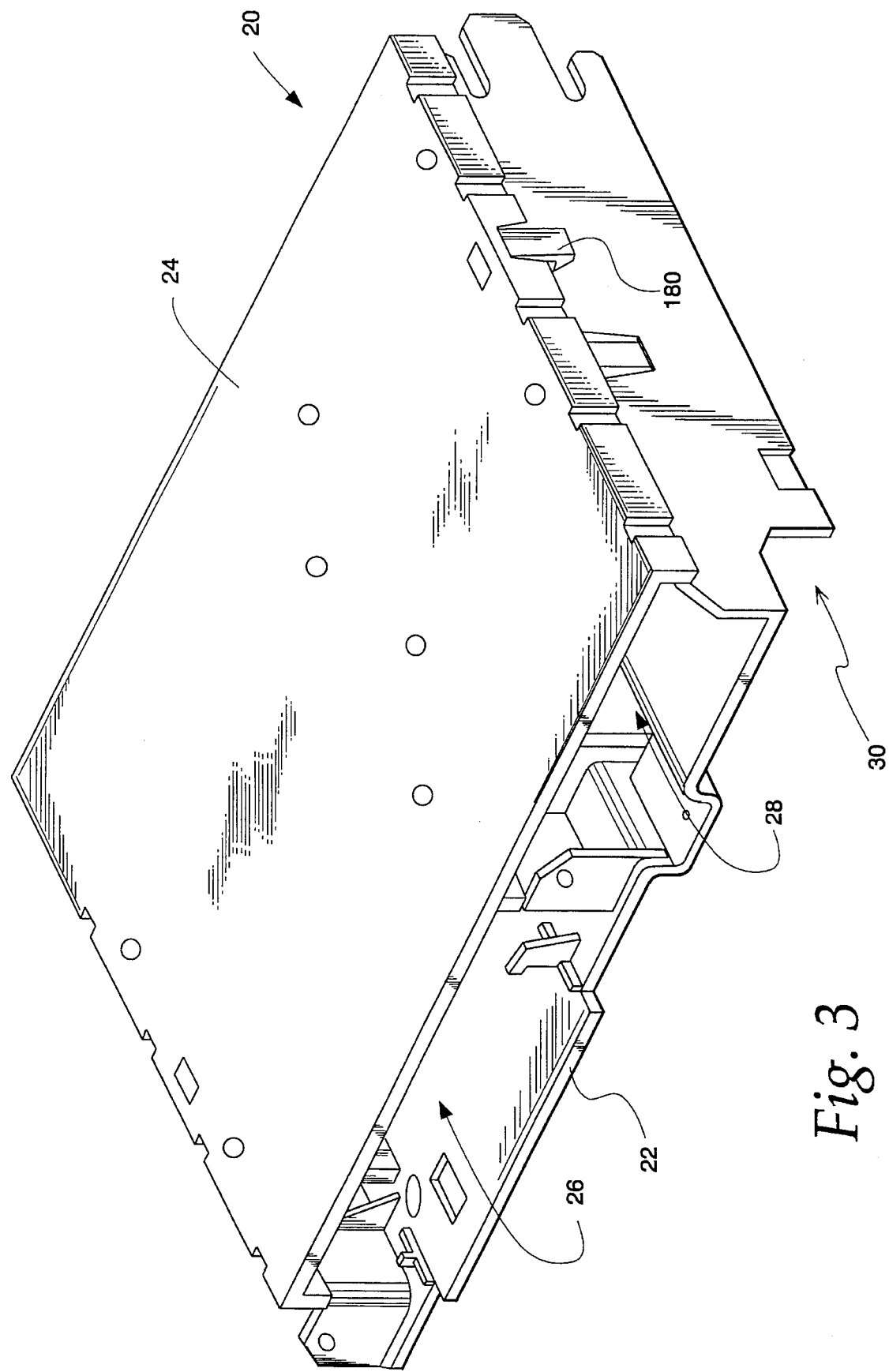
FIG. 3 is a perspective view of an assembled drive platform assembly in accordance with the present invention without any disc drives.

Referring to FIG. 3 present invention relates to a drive platform assembly, generally identified with the reference numeral 20, for carrying various disc drives within a personal computer. In particular, the drive platform assembly 20 in accordance with the present invention includes a drive platform 22 and an expansion platform 24. As will be discussed in more detail below, the drive platform 22 is segregated into a plurality of bays. For example, the drive platform 22 may be configured to define two horizontally oriented bays 26 and 28 and a stacked vertical or lower bay 30, disposed beneath one of the horizontal bays 26 or 28. For convenience, with reference to FIG. 3, the horizontal bay 26 will hereinafter be referred to as the left bay while the other horizontal bay 28 will be referred to as the upper right bay. The lower bay 30 will hereinafter be referred to as the lower right bay.

The left bay is adapted to carry a floppy disc drive, for example, a 3½ inch one-half height floppy disc drive 32. The right bays 28 and 30 are used to carrying two 3½ inch (one inch height) intelligent drive electronics (IDE) hard disc drives 34. The right bays 28 and 30 can also be used to carry a single 1.56-inch height IDE hard disc drive.

Figure 4:
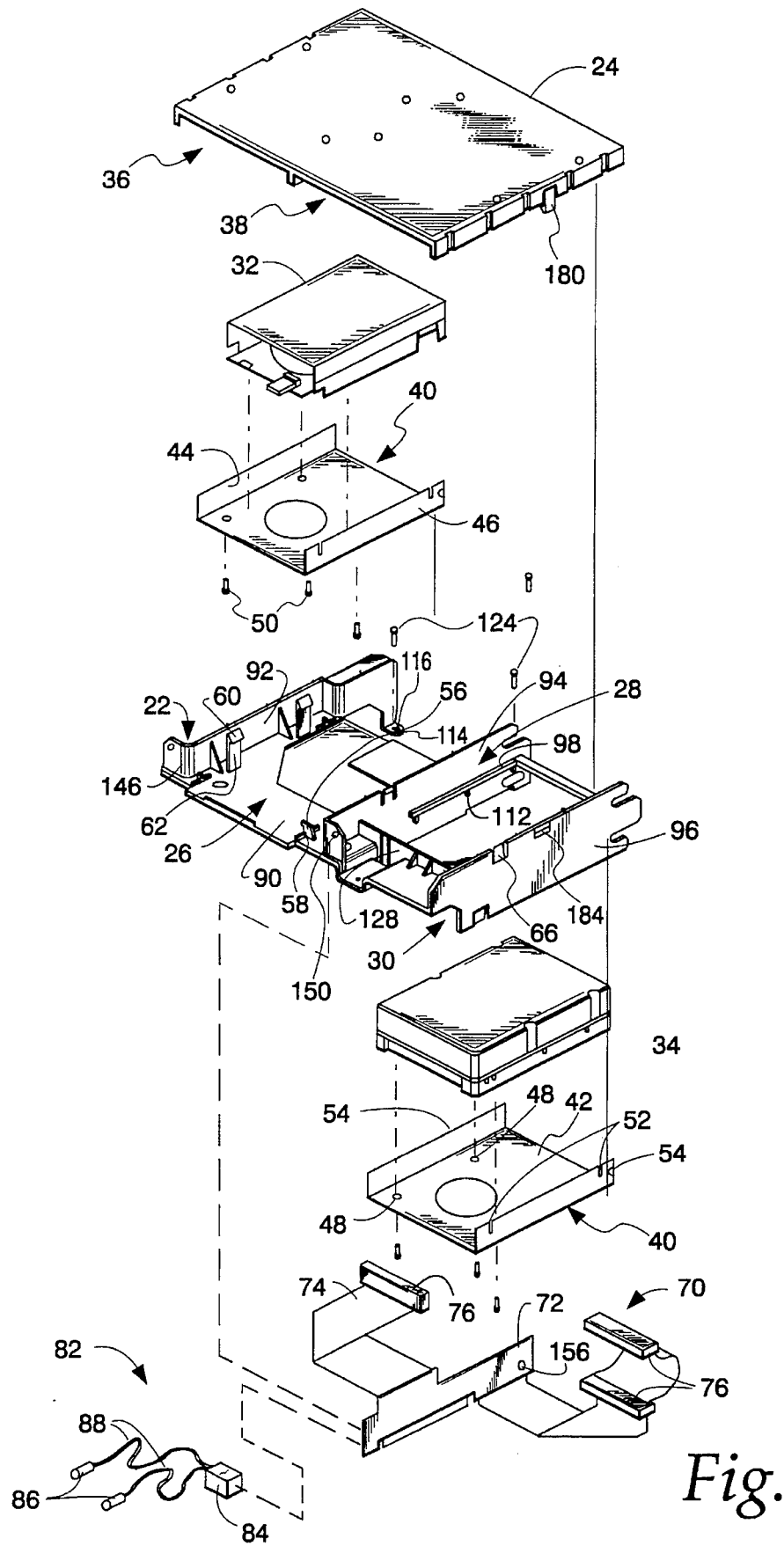
FIG. 4 is an exploded perspective view of a drive platform assembly in accordance with the present invention which illustrates a plurality of disc drives and a cable assembly in accordance with the present invention.

The expansion platform 24 can be used to carry additional disc drives, such as a 5¼ inch half height hard or floppy disc drive and a 3½ inch IDE hard disc drive. As will be discussed in more detail below, and as shown in FIG. 4, the expansion platform 24 defines two side-by-side horizontal sections defining a left section 36 and a right section 38. The expansion platform 24 is assembled to the drive platform 22 such that the left section 36 is disposed above the left bay 26 of the drive platform 22 and the right section 38 is disposed above the right bays 28 and 30 of the drive platform 22.

An important aspect of the invention is the ease in which both floppy and hard disc drives can be installed into a personal computer utilizing the drive platform assembly 20 (FIG. 3) in accordance with the present invention. As such, the complexity and assembly time of the personal computer is significantly reduced which, in turn, reduces the overall cost of the computer. In addition, replacements and upgrades of both floppy and hard disc drives is greatly facilitated, thus making such replacements less complicated to enable non-technical end users to replace or upgrade such drives without the need for a computer technician.

The drive platform assembly 20 (FIG. 3) includes a mounting bracket 40, suitable for mounting both hard and floppy disc drives as shown in FIG 4. In particular, the mounting bracket 40 acts as a sub-carrier for both 3½ inch floppy and hard disc IDE drives 32 and 34. The mounting bracket 40 is formed as a generally U-shaped member defining a bight portion 42 and two depending sidewall portions 44 and 46. The distance between the depending sidewall portions 44 and 46 is selected to be larger than the width of both a 3½ inch floppy disc drive and a 3½ inch hard disc IDE drive. The bight portion 42 is provided with a plurality of apertures 48 which are adapted to be aligned with threaded standard mounting apertures (not shown) on both 3½ inch floppy disc drives and 3½ inch hard disc IDE drives to enable such disc drives 32 and 34 to be rigidly secured to the mounting bracket 40 with suitable threaded fasteners 50.

Figure 18A:
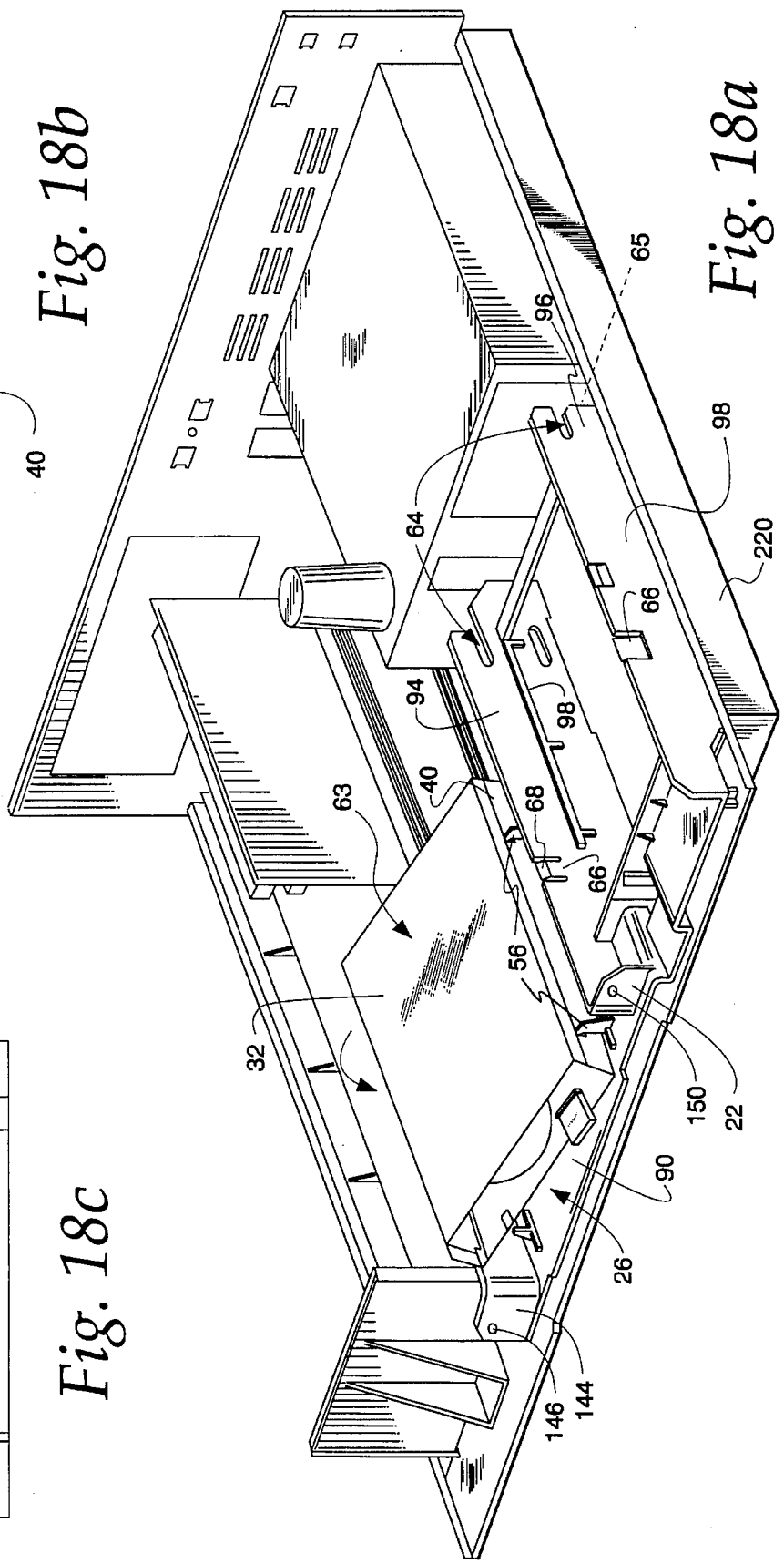
FIG. 18a is a perspective view of the drive platform assembly in accordance with the present invention illustrating the insertion of a floppy disc drive.
Figure 18B:
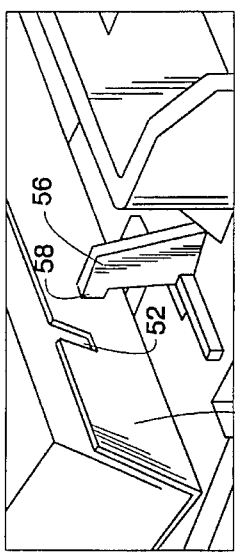
Figure 18C:
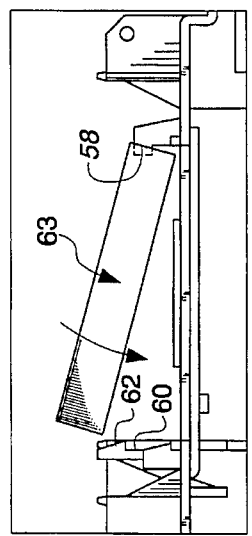

The mounting bracket 40 is provided with a pair of spaced apart notches 52 and a pair of outwardly extending bosses 54 which facilitate assembly of the mounting bracket 40 to the drive platform 22 after a disc drive 32 or 34 has been assembled thereto. In particular, the spaced apart notches 52 are utilized to secure one end of a 3½ inch floppy disc drive 32 to the left bay 26 of the drive platform 22. The notches 52 are spaced apart along one of the depending sidewalls 44 or 46 of the mounting bracket 40. The spacing between the notches 52 in the mounting bracket 40 is selected to correspond with the spacing of a pair of mounting tabs 56, integrally formed in the drive platform 22. The mounting tabs 56 are formed as generally L-shaped members and are spaced apart along one side of the left bay 26 of the drive platform 22. An extending leg portion 58 of the mounting tabs 56 is adapted to be received within the spaced apart notches 52, formed in one of the depending sidewalls 44 or 46 of the mounting bracket 40, to secure one end of the mounting bracket 40 relative to the drive platform 22. The opposing end of the mounting bracket 40 is secured to the drive platform 22 by an opposing pair of resiliently mounted locking tabs 60 disposed on an opposing side of the left bay 26. These locking tabs 60 are formed with a generally L-shape having an extending leg portion 62. The extending leg portion 62 is adapted to capture an edge of the opposing depending sidewall 44, 46 to secure the other end of the mounting bracket 40 relative to the drive platform. In particular, as shown in FIGS. 18*a*–18*c*, the mounting bracket 40 with a disc drive 32 or 34 assembled thereto is secured to the drive platform 22 by disposing the assembly 63 at an angle relative to the plane of the drive platform 22 such that the extending portions 58 of the L-shaped mounting tabs 56 are received in the spaced apart notches 52. The assembly 63 is then rotated counterclockwise (FIGS. 18*a*–18*c*) about an axis generally parallel with a longitudinal axis 65 to bring the opposing sidewall 44 or 46 toward the plane of the drive platform 22. As mentioned above, the L-shaped locking tabs 60 are formed from a resilient material which enables them to bend outwardly as the mounting bracket 40 is being rotated in position. As the bight portion 42 of the mounting bracket 40 comes in contact with the plane of the drive platform 22, the L-shaped locking tabs 60 snap back in place as their respective extending leg portions 62 clear the edge of the depending sidewall 44 to secure the assembly 63 relative to the drive platform 22.

Referring to FIG. 4, the outwardly extending bosses 54 on the mounting bracket 40 are used to secure 3½ inch hard disc IDE drives 34 to the drive platform 22. In particular, the outwardly extending bosses 54 are disposed on opposing depending sidewalls 44 and 46, adjacent one end. These bosses 54, as shown in FIG. 19*a*, are oriented to be received in generally U-shaped slots 64 disposed in the rear portion of the upper and lower right bays 28 and 30 of the drive platform 22. In particular, the bosses 54 form a pivot axis 67, generally perpendicular to the longitudinal axis 65, which enables the assemblies 63 to be rotated and snapped in place in a similar manner as the floppy disc drives.

Figure 19C:
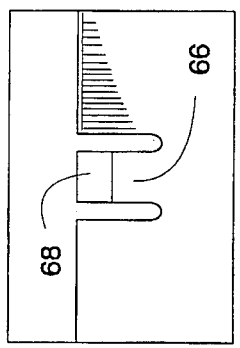
FIGS. 19b and 19c illustrate similar features as FIGS. 18b and 18c.
Figure 19B:
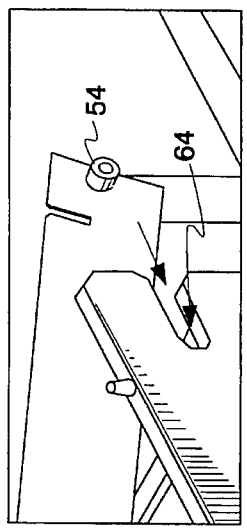
Figure 19A:
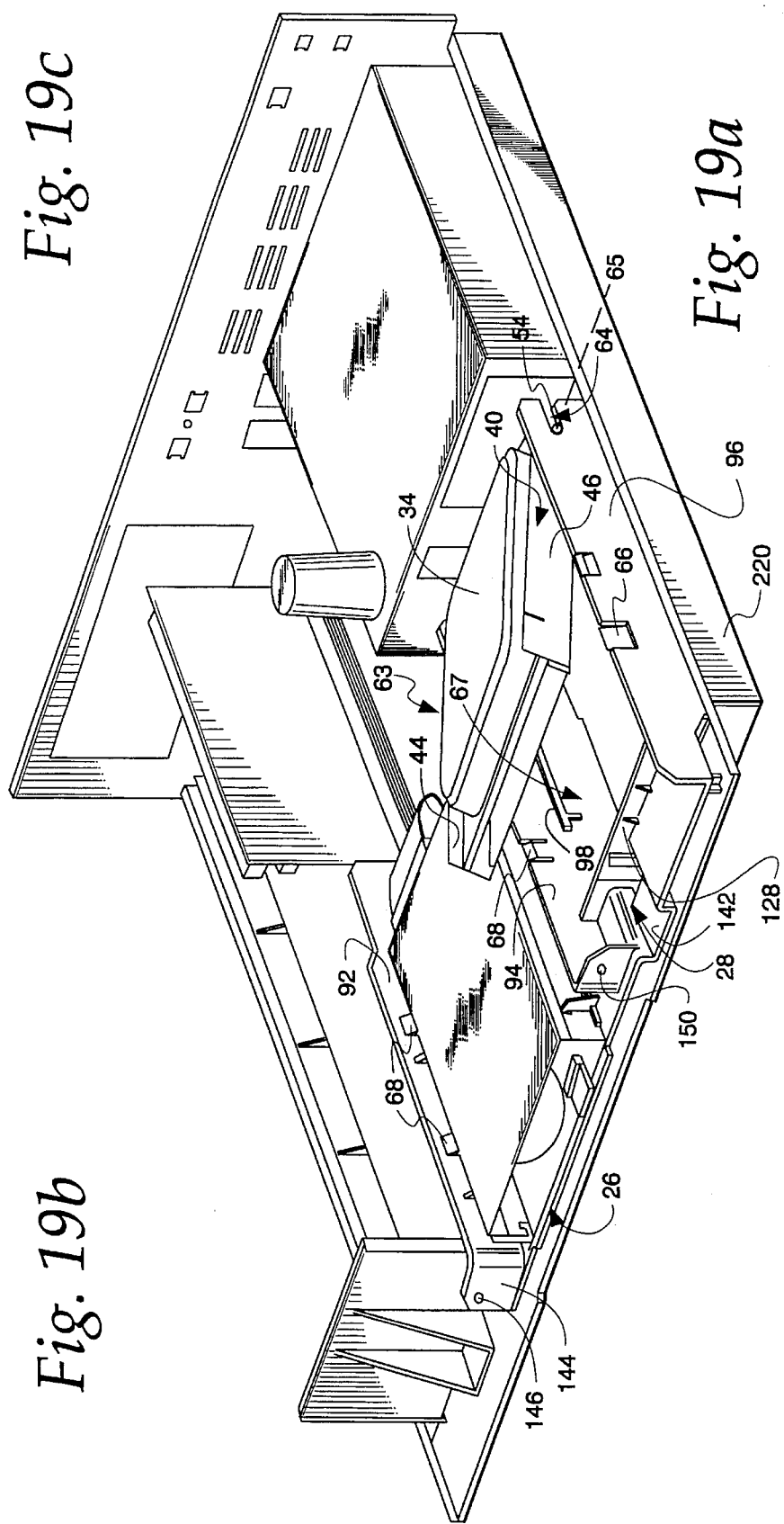
FIG. 19a is similar to FIG. 18a, but illustrates the insertion of a hard disc drive in the top bay of the drive platform.

As best shown in FIGS. 19*a*–19*c*, the drive platform 22 includes a pair of oppositely disposed locking tabs 66. These locking tabs 66 are resiliently mounted and formed in a generally L-shape with an extending portion 68. As the assembly 63 is rotated about the axis 67, the locking tabs 66 are bent outwardly by the assembly 63. As the top edge of the depending sidewalls 44 and 46 clear the extending portions 68, the locking tabs 66 spring back into place to capture a front portion of the depending sidewalls 44 and 46 relative to the drive platform 22. The bosses 54 function to capture the rear portion of the depending sidewalls 44 and 46 to secure the assembly 63 relative to the drive platform 22.

Figure 5:
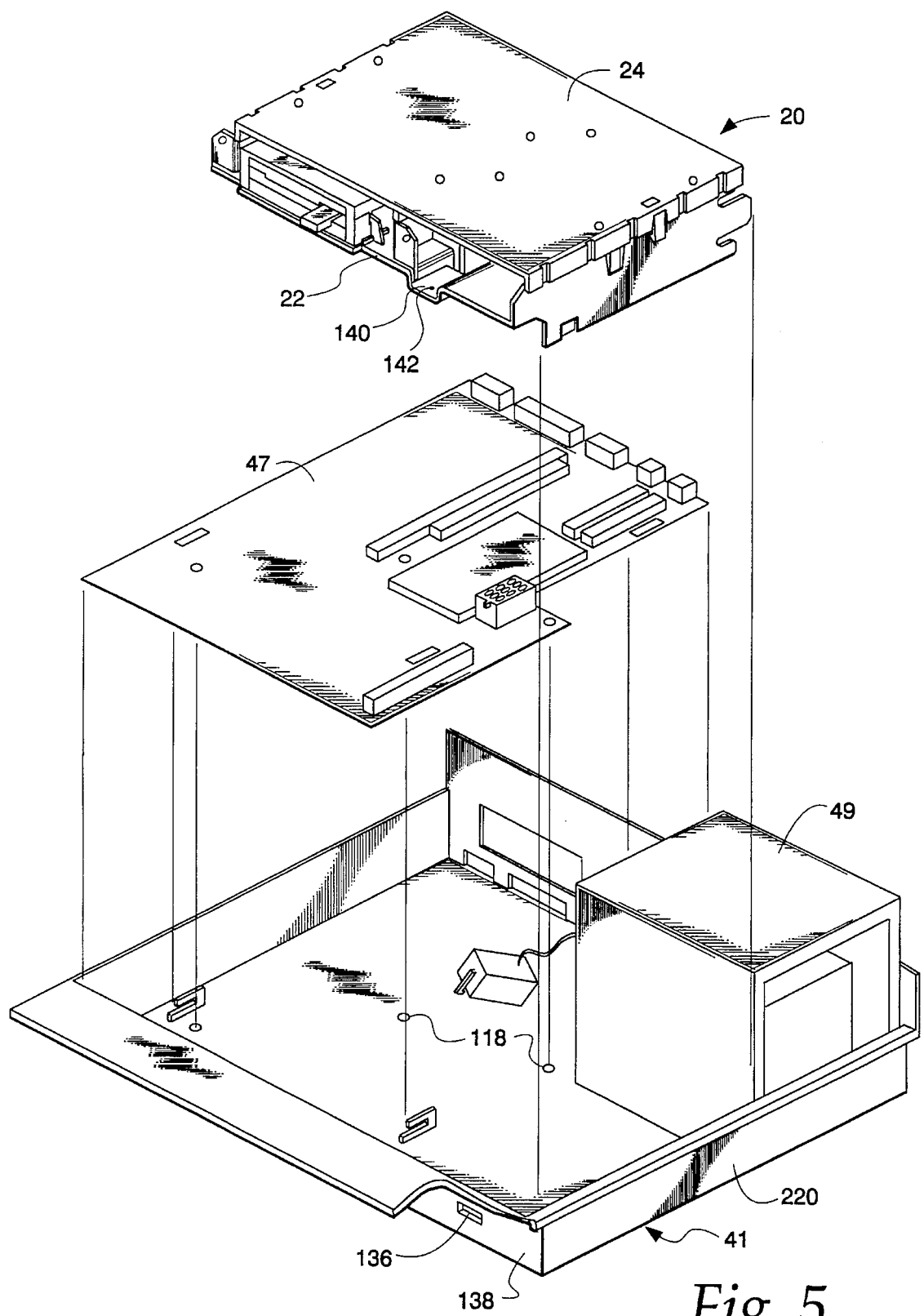
FIG. 5 is an exploded perspective view illustrating a portion of a computer housing assembled with a power supply and further illustrating a motherboard and drive platform assembly with a single floppy disc drive.

In order to facilitate electrical connection of the various disc drives, a drive interface board 70, as shown in FIG. 4, is provided. The drive interface board 70 includes a printed circuit board 72 along with a plurality of ribbon cables 74 connected thereto which, in turn, are connected to electrical connectors 76 which facilitate connection of the disc drives, for example 32 and 34, to the motherboard 47 and power supply 49, as shown in FIG. 5.

Referring once again to FIG. 4, also included is an LED assembly 82. The LED assembly 82 includes an electrical connector 84, a plurality of LEDs 86 connected to the electrical connector 84 by way of individual electrical conductors 88. The LED assembly 82 is adapted to be connected to the drive interface board 70. One LED 86 is used to indicate when a hard disc drives is being accessed. In particular, these LEDs 86 are illuminated during drive accesses both during the power-on self test as well as during normal drive accesses. The other LED 86 is used to indicate a power-on condition. LEDs for the floppy disc drives are self-contained.

The drive platform 22 may be an integrally molded device formed from an electrically insulated material such as acrylonitrile butadiene styrene (ABS). The left bay 26 is formed in a generally U-shape defining a floor portion 90 and two spaced apart sidewalls 92 and 94; generally perpendicular to the floor portion 90. As mentioned above, the left bay 26 includes a pair of spaced apart locking tabs 60. These locking tabs 60 are disposed generally perpendicular to the floor portion 90 and are equally spaced from the sidewall 92. Disposed opposite the locking tabs 60 are the mounting tabs 56. These mounting tabs 56 are spaced apart and equally spaced from the sidewall 94 to correspond with the respective spaced apart notches 52 on the mounting bracket 40.

The right bays 28 and 30 are used for hard disc drives and, in particular, for IDE drives. In particular, the right bays 28 and 30 include the sidewall 94 and another spaced apart sidewall 96. Both sidewalls 94 and 96 are formed to extend below the floor portion 90 of the left bay 26.

As mentioned above, the right bays 28 and 30 are adapted to receive two one-inch height or one 1.56-inch height IDE-type hard disc drives 34. As shown in FIGS. 19*a*–19*c*, these drives 34 are installed in the bays 28 and 30 in part by rotation about the axis 65, generally perpendicular to the plane of the sidewalls 94 and 96. As such, each of the top and bottom bays 28 and 30 are provided with U-shaped slots 64, adapted to receive the extending bosses 54 formed in the mounting bracket 40. Once the hard disc drive 34 is assembled to the mounting bracket 40, the extending bosses 54 are disposed in the opposing U-shaped slots 64 formed in the depending sidewalls 94 and 96. If the drive 34 is to be installed in the upper right bay 28, the drive platform 22 can remain connected to the main housing. In this application, the extending bosses 54 from the mounting bracket 40 are disposed in the opposing U-shaped slots 64 at the rear of the upper right bay 28. A pair of horizontal stops 98 are formed on the inner faces of the sidewalls 94 and 96. These horizontal stops 98 are integrally formed as generally horizontal bar-like members and function to carry the edges of the mounting bracket 40 when the mounting bracket 40 is rotated into place. As mentioned above, the assembly 63 is secured relative to the right upper bay 28 by way of the pair of resiliently mounted locking tabs 66, integrally formed in the opposing sidewalls 94 and 96. These locking tabs 66 include an extending portion 68.

Figure 20C:
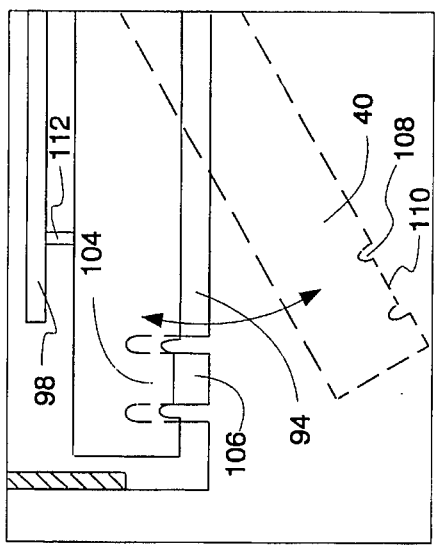
FIGS. 20b and 20c are similar to FIGS. 19b and 19c.
Figure 20B:
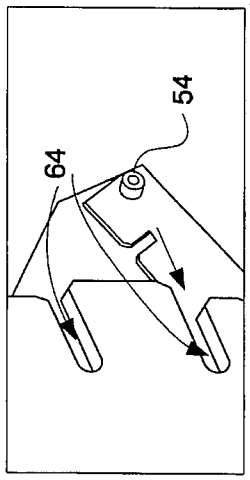
Figure 20A:
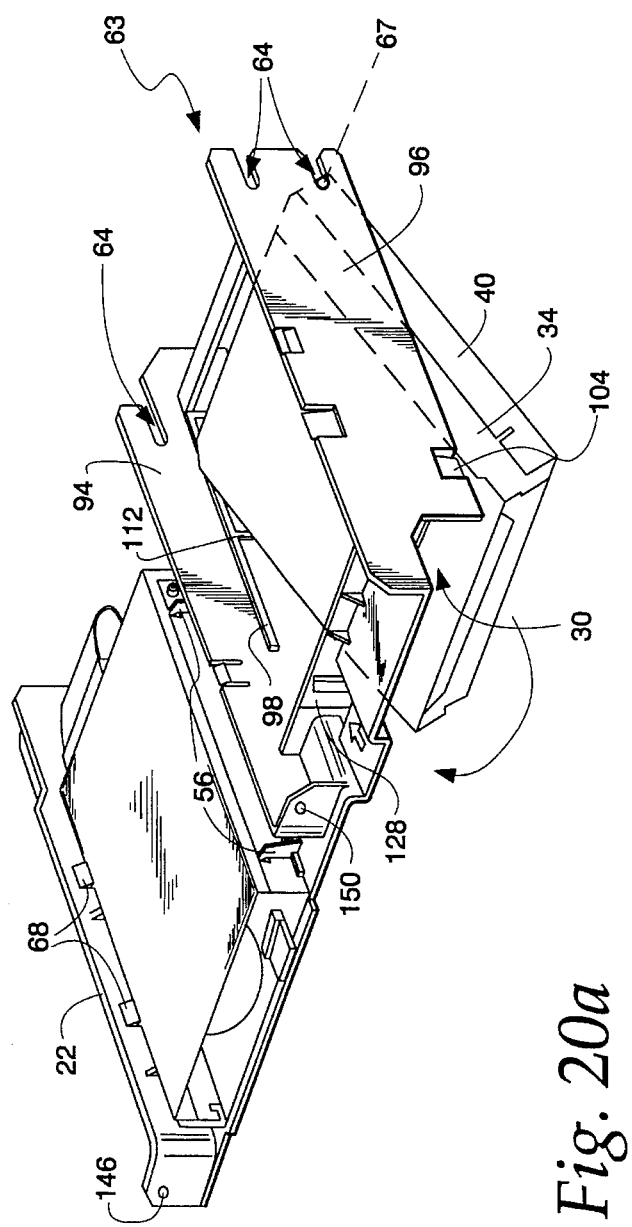
FIG. 20a illustrates the assembly of a hard disc drive to the drive platform assembly.
Figure 25:
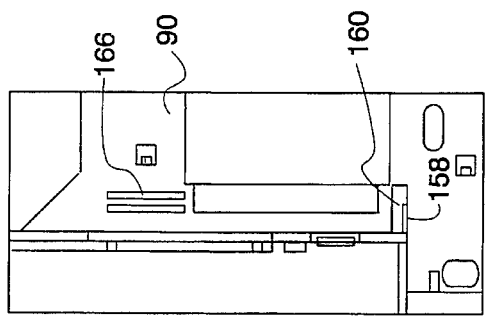
FIGS. 24 and 25 are detailed views of the location and assembly of the drive interface board to the drive platform in accordance with the present invention.

Referring to FIGS. 20*a*–20*c*, the lower right bay 30 similarly includes a pair of slots 64 or apertures to enable an assembly 63 to be rotated into place about the axis 67. In order to secure the assembly 63 in the lower right bay 30 in place, a pair of resiliently mounted locking tabs 104 is formed in the lower right bay 30. These locking tabs 104 also include an extending portion 106 which causes the locking tabs 104 to be bent outwardly when the extending portion 106 engages the mounting bracket 40 as it is rotated into place. In this situation, once the mounting bracket 40 is in place, the extending portion 106 captures the mounting bracket 40. In particular, a pair of cutouts 108 are formed on opposing edges of the mounting bracket 40, adjacent the end opposite the bosses 54. Disposed within the cutouts are integrally formed tabs 110 that are adapted to engage the extending portions 106 of the locking tabs 104 to secure the mounting bracket 40 and thus the assembly 63 relative to the lower right bay 30.

A plurality of vertical stops 112 are formed in the depending sidewalls 94 and 96 to limit movement of the mounting bracket 40 in the lower right bay 30. In particular, these horizontal stops 112 are adapted to engage the opposing edges of the depending sidewalls 44 and 46 of the mounting bracket 40. As shown, these stops 112 may be formed as generally rectangular members integrally formed and extending from the stops 98 in a generally perpendicular direction.

Figure 6:
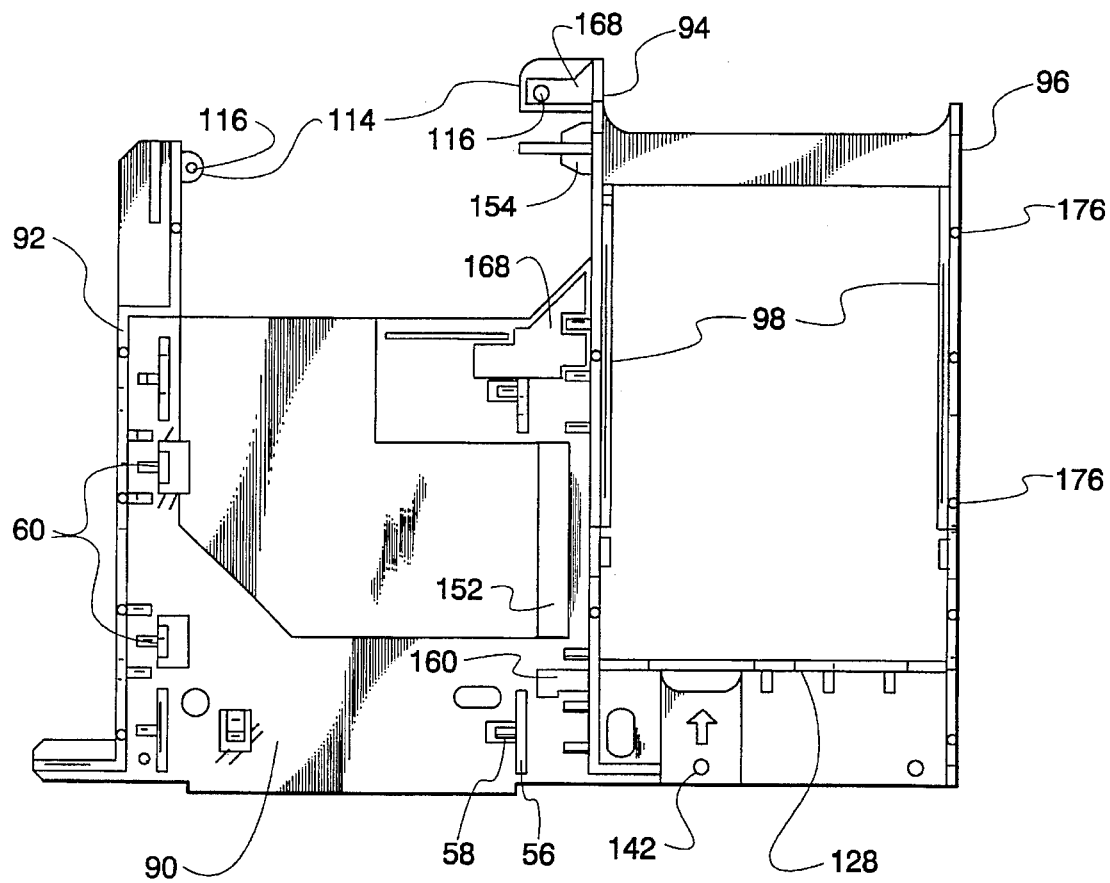
FIG. 6 is a top view of a drive platform which forms a portion of the drive platform assembly in accordance with the present invention.

In the event a hard disc drive needs to be either replaced or installed in the lower right bay 30, provisions are made for removing the drive platform 22. In particular, when either floppy disc drives or hard disc drives are either installed or replaced in the left bay 26 or the upper right bay 28, these drives can be installed in the drive platform 22 with the drive platform 22 in place. However, when it is necessary to either install or replace a hard disc drive in the lower right bay 30, the drive platform 22 must be removed from the computer housing. Referring now to FIGS. 4 and 6 order to facilitate removal of the drive platform 22, a pair of mounting flanges 114 are mounted on a rear portion of the drive platform 22. These mounting flanges 114 are formed with centrally disposed apertures 116. These apertures 116 are adapted to be aligned with corresponding threaded apertures 118 (FIG. 5) in a base portion 220 of the computer housing 41 to enable the drive platform 22 to be secured thereto by way of suitable threaded fasteners 124 (FIG. 4). These flanges 114 may also be used to secure other components to the base 220, such as the computer motherboard 126. In particular, the motherboard 126 may be provided with suitable apertures (not shown), adapted to be aligned with the apertures 116 and 118 to enable the motherboard 126 to be secured to the base portion 220 along with the drive platform 22.

Figure 7:
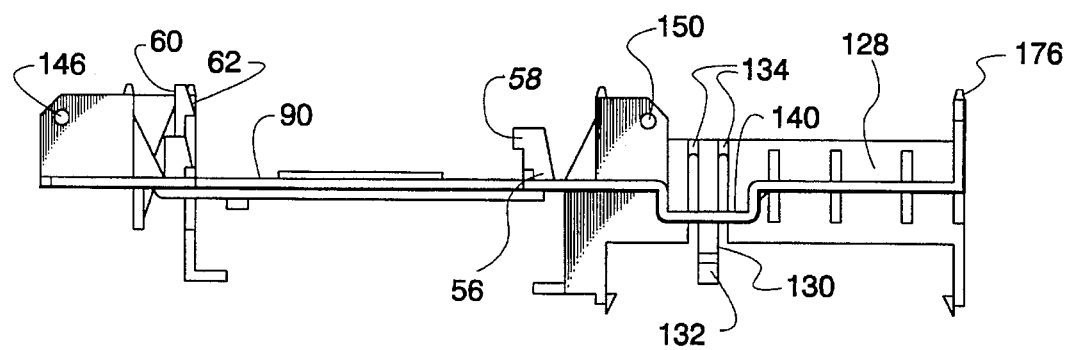
FIG. 7 is an elevational view of the drive platform illustrated in FIG. 6.

Referring to FIGS. 6 and 7 front portion of the right bays 28 and 30 of the drive platform 22 includes provisions for easily and conveniently releasably securing the front portion of the drive platform 22 to the computer housing 41. In particular, a depending sidewall 128 is integrally formed between the depending sidewalls 94 and 96. This depending sidewall 128 extends below the floor 90 and is formed with a resiliently mounted locking tab 130, formed with an extending portion 132. This locking tab 130 may be formed in part by providing parallel spaced notches 134 in the depending sidewall 128. By extending these notches 134 a substantial distance along the height of the depending sidewall 128, the resilient locking tab 130 is formed. The extending portion 132 of the locking tab 130 is adapted to be received in an aperture 136 formed in a vertically extending sidewall 138 in the base portion 220 of the computer housing 41 (FIG. 5).

Referring to FIGS. 5 and 7, in order to facilitate relatively easy engagement of the locking tab 130, an access area 140 is provided in front of the depending sidewall 128. This access area 140 is generally formed as an extension of the floor 90 with a step portion 142. This step portion 142 easily enables an end user to engage the locking tab 130 to disengage it from the aperture 136, formed in the vertically extending sidewall portion 138 of the base portion 220 of the computer housing 41.

In order to remove the drive platform 22, the base portion 220 of the computer housing 41 needs to be exposed. Once exposed, the cables and attached connectors can be disconnected from the various drives carried by the drive platform 22. Subsequently, the threaded fasteners 124 (FIG. 4) are removed and the extending portion 132 of the locking tab 130 is disengaged from the base portion 220 of the computer housing. The drive platform 22 is then relatively easily and conveniently removed in order to enable a hard disc drive to be installed in the lower right bay 30.

Figure 23:
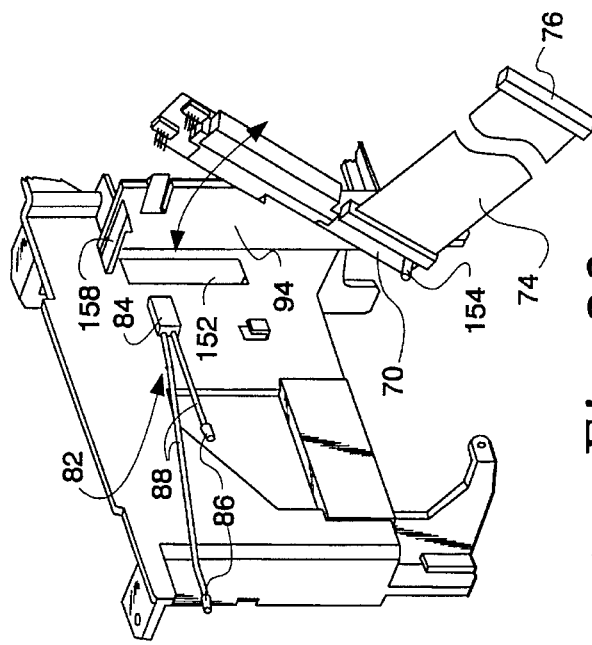
FIGS. 22 and 23 are perspective views illustrating the insertion of a drive interface board in accordance with the present invention.
Figure 24:
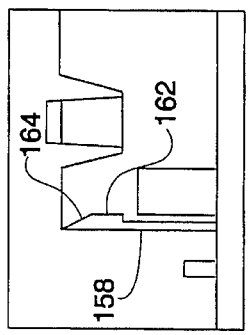
Figure 22:
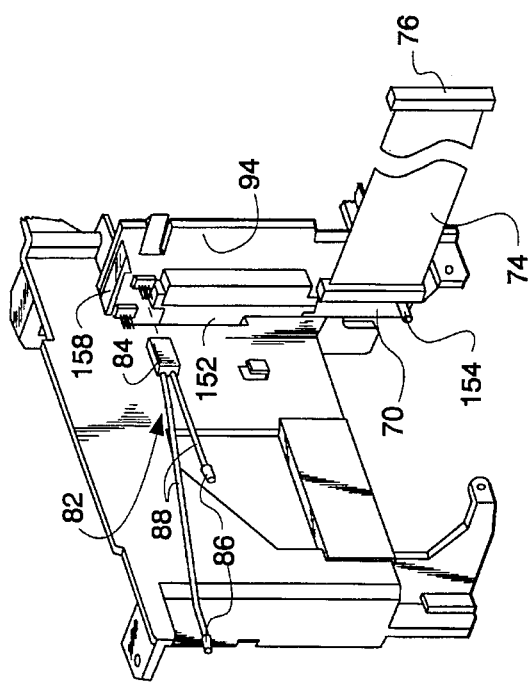

Referring to FIG. 4, the drive platform 22 also includes provision for carrying the LEDs 86 for the various drives carried by the platform 22. In particular, the sidewall 92 is integrally formed with an extending portion 144 disposed generally perpendicularly thereto at the front of the platform 22. This extending portion 144 may be provided with an aperture 146 for carrying a LED 86. Similarly, the extending sidewall 94 is integrally formed with an outwardly extending portion with an aperture 150 for carrying another LED 86 for any hard disc drives carried by the drive platform 22. As mentioned above, the LEDs 86 form part of an LED assembly 82 which, in turn, is driven by the drive interface board 70 (FIGS. 22–23).

Figure 11:
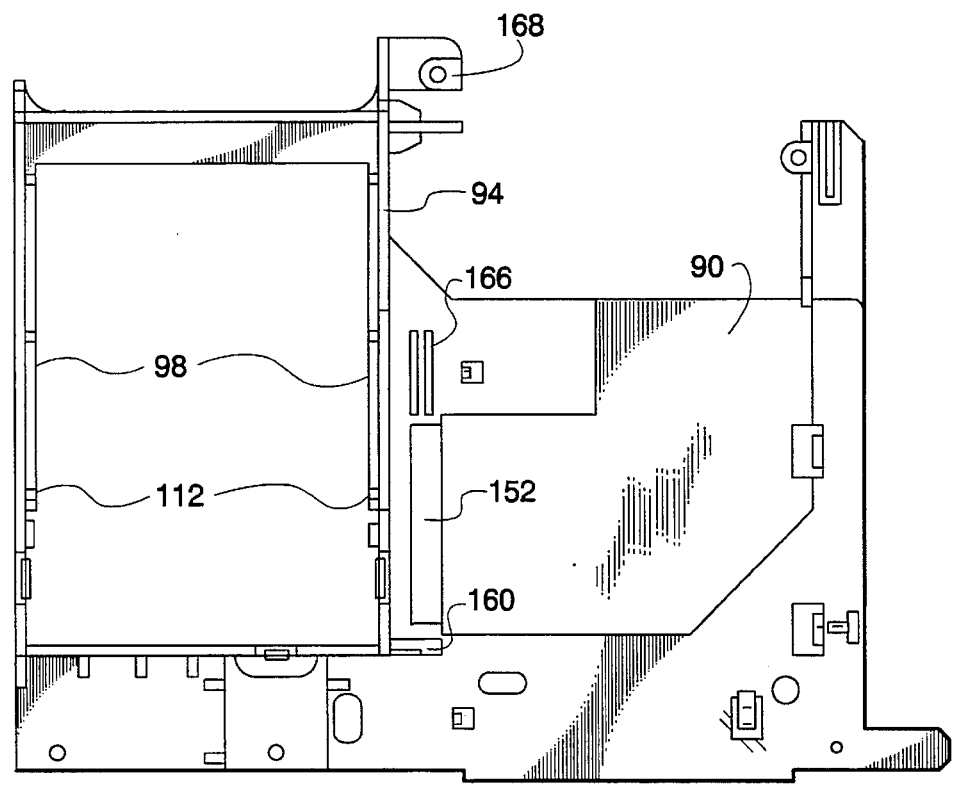
FIG. 11 is a bottom view of the drive platform in accordance with the present invention.

As shown in FIGS. 22–25, the drive interface board 70 is carried underneath the left bay 28, adjacent the sidewall 94. In particular, a generally rectangular slot 152 is formed in the floor 90 adjacent the sidewall 94 (FIG. 11). This slot 152 is used to receive a portion of the drive interface board 70 and also enable a ribbon cable 74 for any floppy disc drive installed in the left bay 28 to be disposed on top of the floor 90.

The drive platform 22 also includes provisions for quick and easy mounting of the drive interface board 70. In particular, on a lower portion of the depending sidewall 94 beneath the floor 90, an inwardly facing stud 154 is integrally formed. This stud 154 (FIG. 6) is adapted to be received in a corresponding aperture 156 formed in the drive interface board 70. Another locking tab 158 is formed opposite the extending stud 154 on the lower portion of the depending sidewall 94. This locking tab 158 includes a slot 160 for receiving an edge of the printed circuit board 72 forming a portion of the drive interface board 70. This slot 160 is formed on an extending member 162 formed to be generally perpendicular to the depending sidewall 94. This extending member 162 is formed with a bevelled portion 164 which facilitates mounting of the drive interface board 70 at the factory. In particular, the extending member 162 is free on two ends. Thus, in order to install the drive interface board 70, the stud 154 is inserted into the aperture 156 on the printed circuit board 72. The printed circuit board 72 is then rotated in a generally counter clockwise direction. As an edge of the printed circuit board 72 engages the bevelled portion 164, the extending member 162 bends outwardly until one corner of the printed circuit board 72 rests in the slot 160. In order to facilitate positioning of the printed circuit board 72, a guide 166 may be formed on the underside of the floor 90. The guide 166 may be integrally formed as two parallel and spaced apart elongated bar portions, spaced apart slightly more than the width of the printed circuit board 72. The guide 166 also enables the printed circuit board 72 to be captured or secured on three ends.

Figure 8:
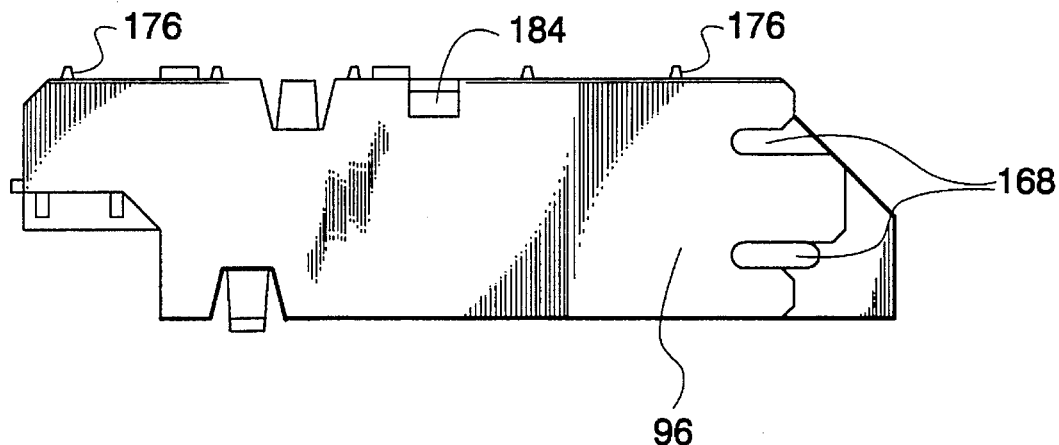
FIG. 8 is a side elevational view of one side of the drive platform assembly in accordance with the present invention.

As best shown in (FIGS. 6, 8 and 9), an expansion ground bracket 168 is provided. This bracket 168 may be integrally formed and adapted to provide a ground connection between the various mounting brackets 40 (FIG. 4) installed on the drive platform 22. In addition, as best shown in FIGS. 11 and 15, the ground bracket 168 also provides a ground connection to the base portion 220 of the computer housing 41.

Figure 12:
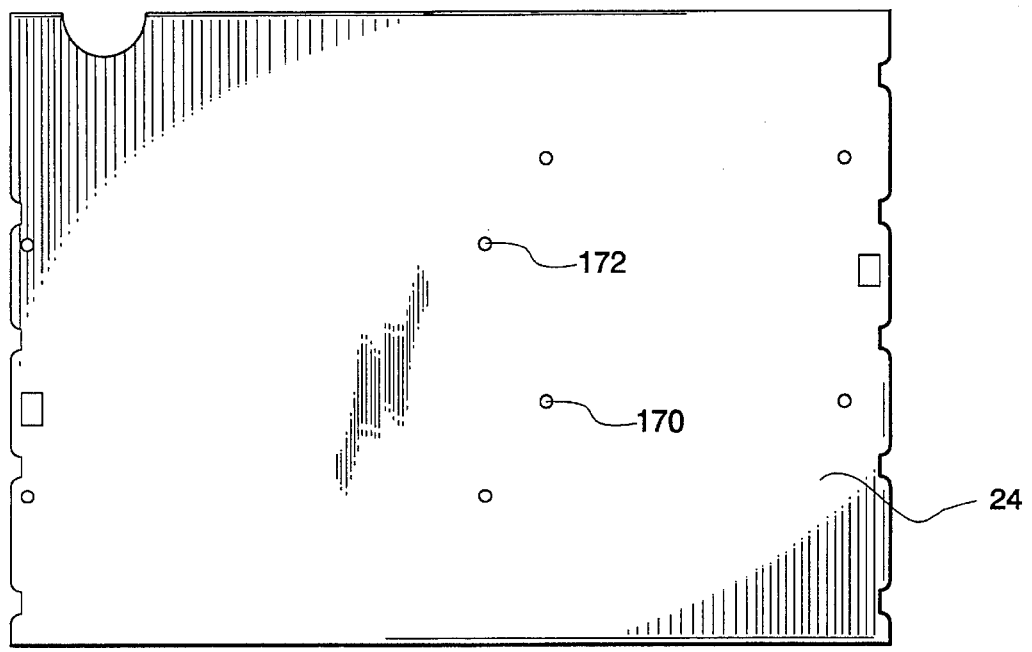
FIG. 12 is a plan view of an expansion platform which forms a portion of the drive platform assembly in accordance with the present invention.
Figure 13:
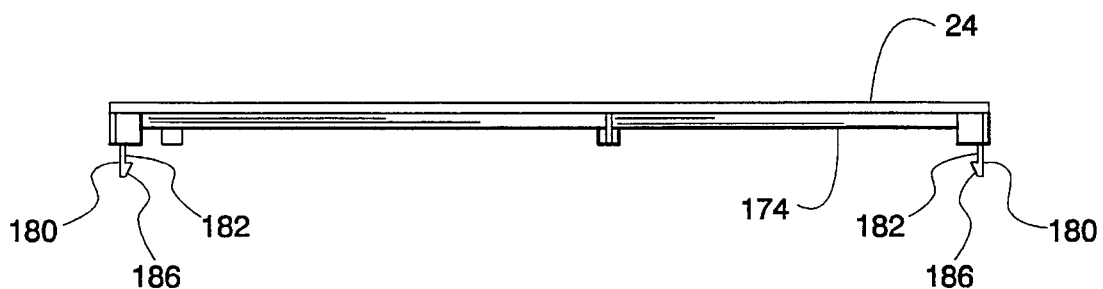
FIG. 13 is a front elevational view of the expansion platform illustrated in FIG. 12.

Another important aspect of the invention is the expansion platform 24, as shown in FIGS. 12 and 13. This expansion platform 24 is adapted to be relatively easily secured to the drive platform 22 while at the same time providing expansion capabilities for carrying additional drives. In particular, the expansion platform 24 is formed as a generally rectangular member formed with a plurality of sets of apertures 170 and 172, appropriately spaced apart for securing additional drives thereto. As best shown in FIG. 15, the underside of the expansion platform 24 may be integrally formed with a plurality of ribs 174 to provide support for the weight of the disc drives. The set of apertures 170 are disposed on the left portion 38 of the expansion platform 24 and are configured to be aligned with the mounting holes (not shown) in a 5¼ inch hard disc drive or floppy disc drive. The set of apertures 172 disposed on the right portion 40 of the expansion platform 24 are configured to be aligned with the mounting holes (not shown) for a 3½ inch IDE hard disc drive.

Figure 9:
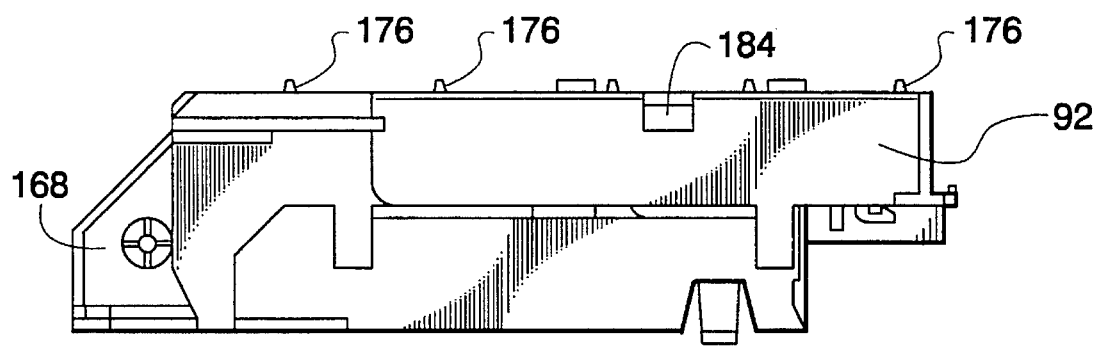
FIG. 9 is similar to FIG. 8, but illustrates the side opposite that illustrated in FIG. 8.
Figure 10:
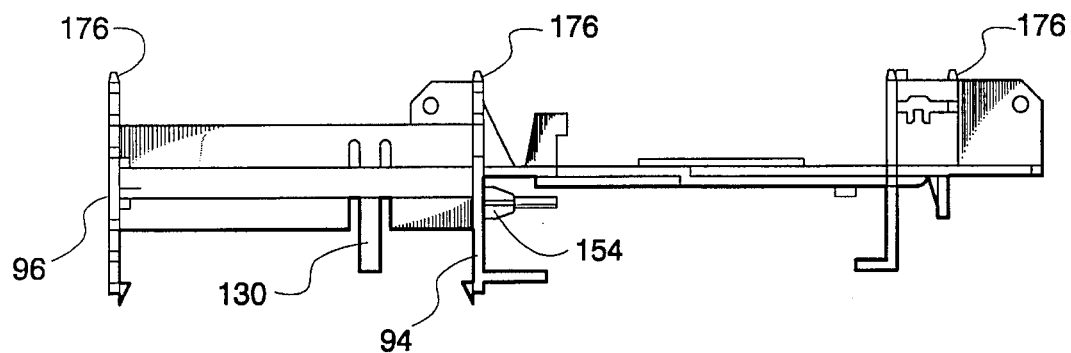
FIG. 10 is a rear elevational view of the drive platform in accordance with the present invention.

The expansion platform 24, shown in FIG. 12, is relatively easily secured to the drive platform 22. In particular, as shown in FIGS. 6 and 8–10, projections 176 are formed on the top edges of the depending sidewalls 92, 94 and 96 of the drive platform 22. These projections 176 may be formed as truncated cones, for example. Referring now to FIGS. 14–17 projections 176 are adapted to be received in corresponding receptacles 178, integrally formed on the underside of the expansion platform 24. In order to secure the expansion platform 24 relative to the drive platform 22, a pair of oppositely disposed locking tabs 180 with extending portions 182 are formed on the underside of the expansion platform 24. These locking tabs 180 are disposed on opposing edges of the expansion platform 24 and are adapted to be aligned with opposing notches 184 (FIGS. 8–9)formed on the outward portion of the depending sidewalls 92 and 94. As shown in FIG. 9, the locking tabs 180 may be formed with a bevelled portion 186 which enables the locking tabs 180 to be bent outwardly in order to release the expansion platform 24 from the drive platform 22 (FIG. 3). Once the expansion platform 24 is released and removed, hard or floppy disc drives may be secured thereto rather quickly and easily by aligning the mounting holes in the particular drive with the appropriate set of apertures 170 or 172 in the expansion platform 24 (FIG. 15). Suitable fasteners (not shown) are then used to secured the particular drive to the expansion platform 24. After the drive is assembled to the expansion platform 24, the assembly may be rather quickly and easily be assembled to the drive platform 22 by aligning the projections 176, formed on the depending sidewalls 92, 94 and 96 of the drive platform 22 (FIGS. 9–10) with the corresponding receptacles 178 formed in the underside of the expansion platform 24 (FIG. 16). Referring to FIGS. 10 and 14–17, once the projections 176 and the receptacles 178 are aligned, the assembly is then pushed downwardly until the extending portions 182 of the locking tabs 180 are captured within the notches 184 formed in the drive platform 22.

The expansion platform is just as easily removed. In particular, the expansion platform 24 is removed by grasping the bevelled portion 186 of the locking tab 180 and bending it outwardly enough to disengage the extending portion 182 of the locking tab 180 from the notch 184. After the extending portion 182 is disengaged from the notch 184, the expansion platform is simply moved upwardly relative to the drive platform. In the case of a replacement of an existing disc drive, the cables 74 should be disconnected prior to removal of the expansion platform. Either a single ground clip or multiple ground clip 173 are disposed on the expansion platform 24.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A drive platform assembly adapted to carry floppy and hard disk drives for a personal computer, comprising:

a drive platform defining a plurality of predetermined bays adapted to carry one or more predetermined disk drives of predetermined types, said drive platform formed from a predetermined electrically insulative material and including means for removably receiving predetermined mounting brackets which are adapted to rigidly carry said disk drives, said removably mounting means includes means for enabling said mounting brackets to be rotated about a predetermined axis into position relative to said drive platform, said mounting brackets defining a longitudinal axis and formed from an electrically conducting material; and a ground bracket disposed adjacent to said drive platform so as to automatically provide a continuous electrical path between said mounting brackets when said mounting brackets are in position in said one or more bays and providing an electrically conductive ground point for grounding said ground bracket to a ground external to said drive platform.

2. A drive platform assembly as recited in claim 1, wherein said ground bracket is formed as a unitary member.

3. A drive platform assembly as recited in claim 1, wherein said predetermined axis is generally parallel to the longitudinal axis of said mounting bracket.

4. A drive platform assembly as recited in claim 1, wherein said predetermined axis is generally perpendicular to the longitudinal axis of said mounting bracket.

5. A drive platform assembly as recited in claim 1, further including means for removably securing said mounting bracket in position.

6. A drive platform assembly as recited in claim 1, wherein said drive platform is configured with a plurality of side by side bays, said side by side bays being open on top.

7. A drive platform assembly as recited in claim 6, further including means for closing the top of said side by side bays, said closing means forming an expansion platform for carrying one or more disk drives.

8. A drive platform assembly as recited in claim 1, further including means rigidly secured to said drive platform for enabling electrical conductors associated with the disk drives carried by said drive platform to be connected to a common printed current board, said printed circuit board disposed adjacent said drive platform.

9. A drive platform assembly as recited in claim 8, further including means for providing an indication of the operation of said disk drives connected to said common printed circuit board.

10. A drive platform assembly as recited in claim 1, wherein predetermined mounting brackets are formed as a unitary member.

11. A drive platform assembly for carrying a plurality of predetermined disk drives, comprising:

an integrally formed drive platform formed from an electrically insulative material, said drive platform formed with a plurality of bays removably receiving predetermined mounting brackets, each of said mounting brackets formed as a unitary member defining a longitudinal axis and formed from an electrically conductive material and adapted to being directly rigidly secured to one of said disk drives forming a disk drive subassembly; and means for enabling said disk drive subassemblies to be rotated about a predetermined axis into position in said bays; and means for automatically completing an electrical conducting path between said brackets when said disk drive subassembly is placed in position.

12. A drive platform assembly as recited in claim 11, wherein said predetermined axis is generally parallel to said longitudinal axis defined by said mounting bracket.

13. A drive platform assembly as recited in claim 11, wherein said predetermined axis is generally perpendicular to said longitudinal axis defined by said mounting bracket.

14. A drive platform assembly as recited in claim 11, wherein said drive platform defines a plurality of side by side bays, said side by side bays open on top and closed by a member defining an expansion platform for carrying one or more disk drives.

15. A drive platform assembly as recited in claim 11, wherein said completing means includes a grounding bracket formed as a unitary member from an electrically conducting material, said grounding bracket disposed adjacent to said drive platform for providing a continuous electrical path among all of the mounting brackets in position in said bays.

* * * * *